United States Patent [19]
Trumbull et al.

[11] Patent Number: 5,126,878
[45] Date of Patent: Jun. 30, 1992

[54] PORTABLE STEREOSCOPIC VIEWING APPARATUS

[76] Inventors: Donald E. Trumbull, 20867 Exhibit Pl., Woodland Hills, Calif. 91367; Louis Lichtenfield, 8360 Sunset View Dr., Los Angeles, Calif. 90069

[21] Appl. No.: 363,540

[22] Filed: Jun. 8, 1989

[51] Int. Cl.⁵ .............. G02B 27/24; G03B 21/00; H04N 13/00
[52] U.S. Cl. .................... 359/472; 353/7; 358/88; 358/91; 359/471; 359/473
[58] Field of Search ........ 350/420, 421, 130, 137, 350/138, 133, 139; 353/7; 358/88, 91

[56] References Cited

U.S. PATENT DOCUMENTS

| | | | |
|---|---|---|---|
| 1,349,018 | 8/1920 | Terashima | 350/137 |
| 2,289,521 | 7/1942 | Rose | 352/57 |
| 2,380,088 | 7/1945 | Tickell | 350/135 |
| 2,413,996 | 1/1947 | Ramsdell | 352/60 |
| 3,160,889 | 12/1964 | Giacometti | 352/60 |
| 3,187,339 | 6/1965 | Clay | 352/61 |
| 3,357,770 | 12/1967 | Clay | 350/131 |
| 3,425,775 | 2/1969 | Jacobsen | 350/420 |
| 3,482,908 | 12/1969 | McCormick | 352/38 |
| 3,502,401 | 3/1970 | Thompson | 352/69 |
| 3,551,036 | 12/1970 | Bielusici | 352/60 |
| 3,891,313 | 6/1975 | Murphy | 350/132 |
| 4,168,885 | 9/1979 | Kent et al. | 352/60 |
| 4,235,503 | 11/1980 | Condon | 350/132 |
| 4,436,369 | 3/1984 | Bukowski | 350/130 |
| 4,509,832 | 4/1985 | Jacobson | 350/420 |
| 4,523,226 | 6/1985 | Lipton et al. | 358/91 |
| 4,525,045 | 6/1985 | Fazekas | 352/57 |
| 4,555,168 | 11/1985 | Meier et al. | 353/7 |

FOREIGN PATENT DOCUMENTS

| | | | |
|---|---|---|---|
| 59-30390 | 2/1984 | Japan | 358/91 |

*Primary Examiner*—Scott J. Sugarman
*Attorney, Agent, or Firm*—Pretty, Schroeder, Brueggemann & Clark

[57] ABSTRACT

A stereoscopic viewing apparatus and a related method for providing a three-dimensional effect for a viewer based on a side-by-side display on a conventional video screen of related left and right images that are each horizontally compressed, and a stereoscopic video recording for providing such a side-by-side display. The apparatus transmits the displayed left image to the viewer's left eye and the displayed right image to the viewer's right eye, while horizontally expanding the compressed images and returning them to their original, natural proportions. The displayed side-by-side images both extend along the screen's entire vertical length, such that a three-dimensional effect is provided having the same two-dimensional proportions as the conventional video screen.

6 Claims, 1 Drawing Sheet

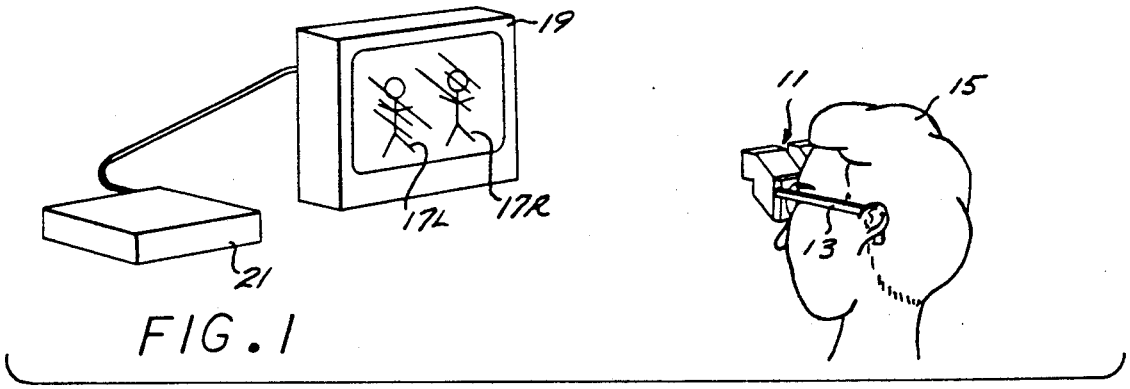
FIG. 1
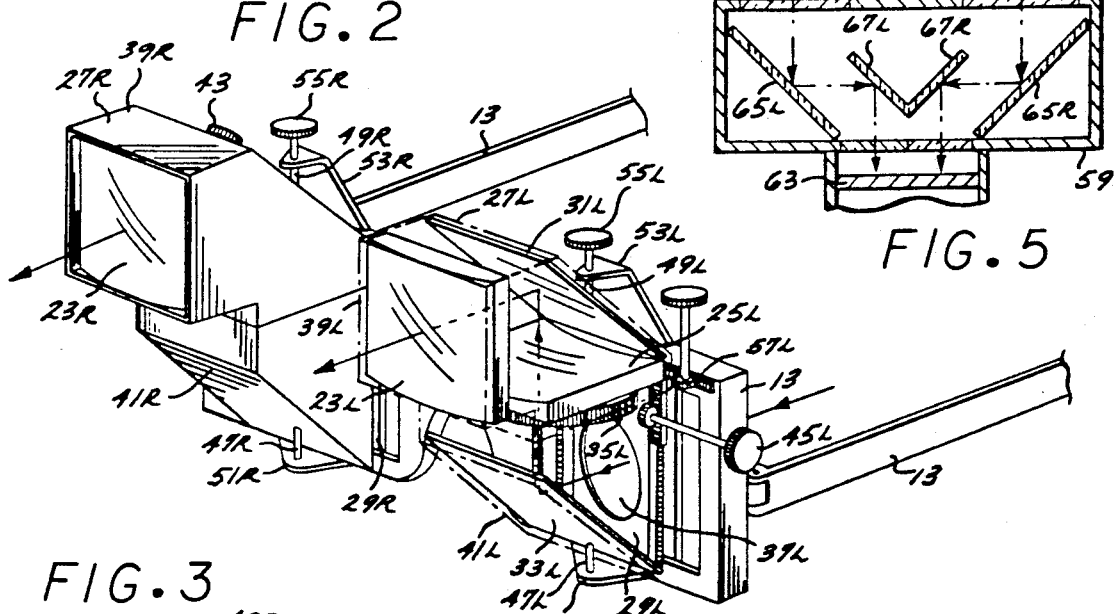
FIG. 2
FIG. 5
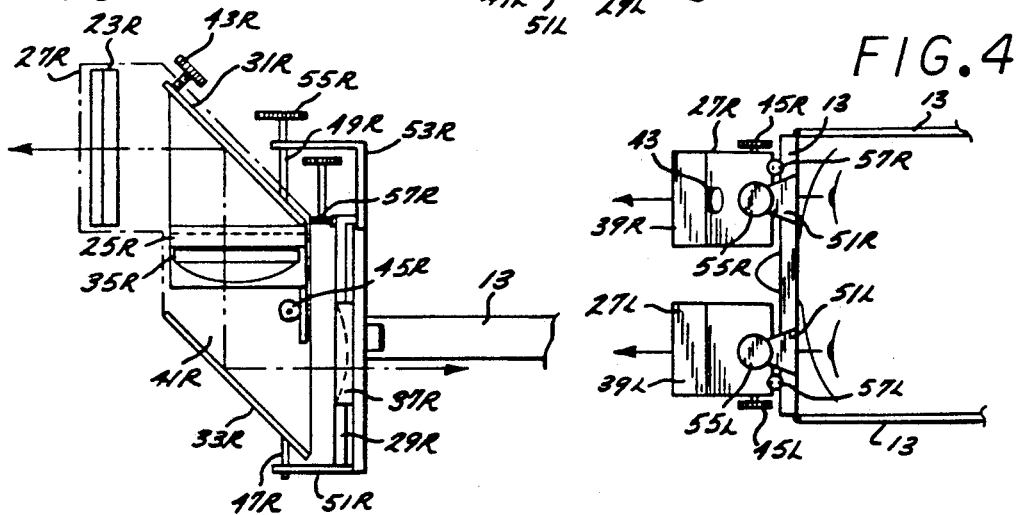
FIG. 3
FIG. 4

PORTABLE STEREOSCOPIC VIEWING APPARATUS

BACKGROUND OF THE INVENTION

This invention relates generally to devices for stereoscopic viewing and, more particularly, to a stereoscopic viewing apparatus and method for viewing two side-by-side related images, and to a stereoscopic recording useful therewith.

Stereoscopic viewing apparatus are used by a viewer to view two related two-dimensional images displayed on a suitable screen and thereby realize a three-dimensional effect. The related images depict the same scene, but as viewed from the perspectives of two locations spaced horizontally a distance approximating the distance between the centers of a typical viewer's eyes. The apparatus provides a three-dimensional effect by causing the viewer's left and right eyes to view the left and right displayed images, respectively. The perceived three-dimensional image has the two-dimensional proportions of the individual two-dimensional images being displayed.

One common type of stereoscopic viewing apparatus is used to view a motion picture of two related images that are projected onto a movie screen such that they overlap. In one version, the light defining the two images is polarized 90 degrees with respect to each other, and the movie screen is adapted to maintain the polarization. To separate the overlapping polarized images, the stereoscopic viewing apparatus includes appropriate polarized filters placed before the viewer's eyes. This polarization technique cannot be used with conventional television receivers, because, unlike movie screens, conventional television screens cannot display the requisite polarized images.

In another version of this common type of stereoscopic viewing apparatus, the two projected images are displayed in different colors, and the viewing apparatus separates the overlapping images using appropriately-colored filters placed before the viewer's eyes. A significant drawback to this version is that it cannot display images that are multi-colored, regardless of the type of display used.

Another example of a prior type of stereoscopic viewing apparatus views a motion picture of two related images that are displayed on a movie screen side-by-side, rather than overlapping. The device transmits the left and right images to the left and right eyes, respectively, without the use of filters. The images could conceivably be adapted for side-by-side display on the screen of a conventional television receiver. However, for the two related images and thus the three-dimensional image to have the same two-dimensional proportions (i.e., aspect ratio) as the conventional television image, the related images cannot occupy all the available vertical dimension of the screen. Thus, this type of apparatus would be unable to utilize the television screen's entire vertical resolution capability.

It will be appreciated from the foregoing that there is a definite need for a stereoscopic viewing apparatus and a related method for viewing on a conventional television screen two side-by-side related images, using the entire vertical resolution capability of the television screen, yet providing a three-dimensional image having the two-dimensional proportions of the conventional television image. It also will be appreciated that there is a need for a stereoscopic video recording that can be used with such an apparatus to provide that three-dimensional effect. The present invention fulfills these needs.

SUMMARY OF THE INVENTION

The present invention resides in a stereoscopic viewing apparatus and a related method for providing a three-dimensional effect for a viewer based on a side-by-side display of related left and right images on a display screen, such as a television screen, wherein the screen's entire vertical resolution capacity is utilized, yet the three-dimensional image has the same two-dimensional proportions as a conventional television image. The apparatus is relatively simple in construction and thus inexpensive to manufacture, and because it further requires only a conventional television receiver for use, it is readily adapted for widespread use.

More particularly, the apparatus is used in association with a display of two side-by-side, related left and right images that are each horizontally compressed by a factor of two. The apparatus includes optical path means defining left and right optical paths for transmitting the displayed left and right images to a viewer's respective left and right eyes. The apparatus further includes disanamorphic lens means located in the left and right optical paths for horizontally expanding the two images being transmitted, to restore the images to their normal two-dimensional proportions. The viewer thus realizes a three-dimensional effect with an image having normal two-dimensional proportions. This horizontal expansion can be accomplished by a separate disanamorphic lens in the optical path for each eye.

In a more detailed feature of the invention, the side-by-side related images are displayed on a conventional television receiver with each image occupying one-half of the television screen. This utilizes the entire vertical resolution capability of the television screen and provides a three-dimensional image having the screen's normal two-dimensional proportions. The displayed side-by-side, horizontally-compressed images are provided by a stereoscopic video recording played on a video player that is used in conjunction with the conventional television receiver.

In another feature of the invention, the apparatus further includes magnifying means located in the left and right optical paths, for magnifying the two images being transmitted such that the images occupy a greater portion of the viewer's field of view. An enhanced three-dimensional effect is thereby provided. This magnification can be accomplished by a separate magnifier in each of the left and right optical paths.

In another feature of the invention, the apparatus further includes means for adjusting the convergence of the left and right optical paths toward the viewer's eyes and means for adjusting the interocular spacing of the left and right optical paths at the viewer's eyes. The stereoscopic viewing apparatus is thereby adapted for use by multiple viewers.

In still another feature of the invention, the apparatus further includes means for carrying the optical path means, the disanamorphic lens means, the magnifying means, and the adjusting means in predetermined positions on the viewer's head.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is a schematic representation of a viewer using a stereoscopic viewing apparatus in accordance with the preferred embodiment of the present invention, to view a conventional television screen displaying related side-by-side images that are each horizontally compressed.

FIG. 2 is a perspective view of the stereoscopic viewing apparatus of FIG. 1.

FIG. 3 is a sectional, side elevational view of the apparatus of FIG. 2, showing the interior optical elements.

FIG. 4 is a plan view of the apparatus of FIG. 2.

FIG. 5 is a sectional, plan view of a partial video camera lens adapted for use in producing a stereoscopic recording in accordance with the preferred embodiment of the present invention.

DESCRIPTION OF THE PREFERRED EMBODIMENT

Referring now to the drawings, and particularly to FIG. 1, there is shown a preferred embodiment of a stereoscopic viewing apparatus 11 that is mounted on an eyeglass-type frame 13 for use by a viewer 15 to obtain a three-dimensional effect while viewing two related, side-by-side images 17L and 17R displayed on a video monitor, e.g., a conventional television receiver 19. The apparatus transmits the displayed left image to the viewer's left eye and the displayed right image to the viewer's right eye. The display of the related left and right images is provided by a stereoscopic video recording which is played on a video player 21.

In accordance with the invention, the left and right displayed images 17L and 17R are each squeezed or compressed horizontally by a factor of two, such that together they occupy the entire screen of the television receiver 19. The apparatus includes disanamorphic lens assemblies for horizontally stretching or expanding (i.e., unsqueezing) the images being transmitted to the eyes such that the images are returned to their normal two-dimensional proportions. Thus, the viewer 15 sees what appears to be a three-dimensional image having the same aspect ratio as the entire screen. In addition, since the entire vertical length of the television screen is utilized, vertical resolution is the same as for normal two-dimensional displays.

More particularly, and as shown in FIGS. 2 and 3, the horizontal stretching is accomplished in the left optical path by a positive cylindrical lens 23L acting in conjunction with a negative cylindrical lens 25L and, in the right optical path, by a positive cylindrical lens 23R acting in conjunction with a negative cylindrical lens 25R. Since the horizontally-compressed images 17L and 17R that are displayed on the television screen 19 are based on images that have normal two-dimensional proportions, the horizontally-expanded, three-dimensional image will have the normal two-dimensional proportions of a conventional television image. Thus, the viewer perceives a three-dimensional image having the two-dimensional proportions that he expects to see when viewing a conventional television receiver.

The optical elements defining the optical path for the image 17L being transmitted to the left eye are carried within a two-part left housing 27L and a left lens assembly 29L, while in a similar fashion the optical elements defining the optical path for the image 17R being transmitted to the right eye are carried within a two-part right housing 27R and a right lens assembly 29R. The left and right housings and lens assemblies are, in turn, carried on the eyeglass-type frame 13, for convenient use by the viewer 15.

More particularly, and with reference to FIG. 2, the optical elements that define the left optical path include the positive cylindrical lens 23L and the associated negative cylindrical lens 25L, an upper mirror 31L and a lower mirror 33L, as well as a positive spherical lens 35L and an associated negative spherical lens 37L. These optical elements are located within an upper section 39L and a lower section 41L that comprise the left housing 27L, except that the negative spherical lens is located in the left lens assembly 29L. The positive cylindrical lens 23L is positioned in a vertical orientation at the top of the upper section of the left housing, to horizontally diverge the transmitted image, and the upper mirror is positioned to redirect the image downwardly. The negative cylindrical lens is positioned in a horizontal orientation at the bottom end of the upper section of the left housing to terminate the image's divergence, and the positive spherical lens is positioned immediately adjacent to the negative cylindrical lens to initiate magnification of the image. Further, the lower mirror is positioned within the lower section of the left housing to redirect the image horizontally, and the negative spherical lens is oriented vertically within the left lens assembly to complete the magnification of the image and direct the magnified, horizontally expanded image to the viewer's left eye.

In a similar fashion, as shown in FIGS. 2 and 3, the right optical path is defined by the positive and negative cylindrical lenses 23R and 25R, upper and lower mirrors 31R and 33R, and positive and negative spherical lenses 35R and 37R. These optical elements are arranged within the upper and lower sections 39R and 41R of the right housing 27R and the right lens assembly 29R, in the same manner as the optical elements for the left optical path are arranged in the upper and lower sections 39L and 41L of the left housing 27L and the left lens assembly 29L, as described above.

The upper and lower mirrors 31L and 33L and 31R and 33R in the respective left and right optical paths are provided to make the apparatus more compact horizontally. This minimizes any tendency of the apparatus to pivot forwardly off of the viewer's head.

The apparatus 11 is preferably adapted to allow consecutive use by multiple viewers. To this end, the apparatus preferably functions to adjust for convergence, tropia and interocular spacing. Further, the apparatus preferably is adapted to focus the magnification in the left and right optical paths.

Tropia adjustment requires adjusting the right optical path with respect to the left optical path to align the two paths vertically with the viewer's eyes. As shown in FIG. 3, this is accomplished by a set screw 43 that is threadably attached to the upper section 39R of the right housing 27R. The screw tip contacts the backside of the upper mirror 31R and, upon rotation, adjusts the upper mirror's angular position.

Focusing is accomplished, as shown in FIGS. 2 and 3, by controllably adjusting the optical path length between the positive and negative spherical lenses. In the left optical path, this adjustment is accomplished by telescopically attaching the upper housing 39L to the lower housing 41L. The relative vertical positions of the upper and lower housings is controllably adjusted by a rack and pinion arrangement 45L. Similarly, in the right optical path, the upper housing 39R is telescopically attached to the lower housing 41R and their relative vertical position is controllably adjusted by a rack and pinion arrangement 45R.

Convergence adjustment involves aligning the left and right optical paths such that a viewer 15 perceives the image received by the left eye aligned horizontally with the image received by the right eye. As shown in FIGS. 2 and 3, this is accomplished by controllably pivoting the left housing 27L and the right housing 27R about vertical axes.

More particularly, for the left housing 27L, the vertical axis is defined by axially-aligned lower and upper pins 47L and 49L, respectively. The lower pin pivotally attaches together the lower section 41L of the left housing 27L with a lower bracket 51L secured to a lower part of the left lens assembly 29L, and the upper pin pivotally attaches the upper section 39L of the left housing with an upper bracket 53L secured to an upper part of the left lens assembly. The left lens assembly, in turn, is attached to the eyeglass frame 13. The left housing is attached to the left lens assembly rather than directly to the frame for reasons involving interocular adjustment, as discussed further below. Controllably turning a knob 55L at the upper end of the upper pin 49L pivots the entire left housing, with the optical elements it carries, relative to the left lens assembly and the eyeglass frame. To accommodate focusing, the upper pin and upper bracket allow the upper section of the left housing to move vertically relative to them.

In a similar fashion, for the right housing 27R, the vertical axis is defined by axially-aligned lower and upper pins 47R and 49R, respectively. The lower pin pivotally attaches the lower section 41R of the right housing 27R with a lower bracket 51R secured to a lower part of the right lens assembly 29R, and the upper pin pivotally attaches the upper section 39R of the right housing with an upper bracket 53R secured to an upper part of the right lens assembly. The right lens assembly, in turn, is attached to the eyeglass frame 13, as discussed further below. A knob 55R at the upper end of the upper pin pivots the entire right housing relative to the eyeglass frame. These elements are substantially identical in structure and function to the corresponding elements for the left housing 27L and the left lens assembly 29L.

Interocular spacing involves adjusting the spacing of the left and right optical paths adjacent to the viewer's left and right eyes. As shown in FIGS. 2 and 3, this is accomplished by slidably attaching the left and right lens assemblies 29L and 29R to the eyeglass frame 13, and adjusting the spacing between the lens assemblies, thereby adjusting the spacing between the left and right negative spherical lenses 37L and 37R. Despite this sliding movement of the lens assemblies, the elements in the left and right optical paths remain aligned since the left and right housings 27L and 27R are attached by pins and brackets to the respective left and right lens assemblies. Adjusting interocular spacing is accomplished by a left rack and pinion arrangement 57L that controllably positions the left lens assembly within the eyeglass frame, and by a right rack and pinion arrangement 57R that controllably positions the right lens assembly within the eyeglass frame.

The mirrors 31L, 31R, 33L and 33R are flat and preferably reflective on their front surfaces to preclude the refraction of incident light and thereby prevent the creation of double images. To reduce interference from spurious light, the interior surfaces of the housings 27L and 27R preferably are black.

As previously mentioned, as shown in FIG. 1 the stereoscopic recording is played on a conventional video player 21 to produce on a conventional television receiver 19 a display of two side-by-side, horizontally compressed, related images 17L and 17R. The stereoscopic recording consists of a conventional video tape and a video signal, recorded on the video tape by a conventional video recorder, that embodies the requisite display of images. The video signal preferably is produced by using a video camera to view an object through a camera lens specially adapted to provide two related images of the object. As shown in FIG. 5, a camera adapter 59 provides left and right related images by receiving light from the object through a left and a right aperture 61L and 61R that are horizontally spaced apart a distance approximating the distance between the centers of a typical viewer's eyes. Light from the object that passes through the apertures is first directed to an anamorphic lens 62 that horizontally compresses the images the light carries by a factor of two, and then to a conventional camera lens and camera, shown schematically at 63 and 64, respectively. This direction toward the anamorphic lens is accomplished using left and right first mirrors 65L and 65R, and left and right second mirrors 67L and 67R. The light through the left aperture is reflected by the left first mirror laterally toward the left second mirror. The left second mirror reflects the received light toward the anamorphic lens. In a similar manner, the light through the right aperture is reflected by the right first mirror towards the right second mirror, and then towards the anamorphic lens.

The mirrors 65L, 65R, 67R and 67R are flat and preferably reflective on their front surfaces to preclude the refraction of incident light and thereby prevent the creation of double images.

It should be appreciated from the foregoing description that the present invention provides a stereoscopic viewing apparatus and a related method for providing a three-dimensional effect for a viewer based on a side-by-side display on a conventional video screen of related left and right images that are each horizontally compressed. The apparatus transmits the displayed left image to the viewer's left eye and displayed right image to the viewer's right eye, while horizontally expanding the compressed images and returning them to their original proportions. The displayed side-by-side images span the screen's entire vertical length, such that a three-dimensional effect is provided having the two-dimensional proportions of the conventional video image.

Although the invention has been described in detail with reference to the presently preferred embodiment, it should be understood by those with ordinary skill in the art that various modifications can be made without departing from the invention. Accordingly, the invention is defined only by the appended claims.

We claim:

1. Portable stereoscopic viewing apparatus for providing a three-dimensional image for a viewer based on a side-by-side display of related left and right images that are each horizontally compressed, the apparatus comprising:

optical path means defining left and right optical paths for transmitting the displayed left and right images to a viewer's left and right eyes, respectively wherein the optical path means includes means for selectively adjusting the convergence of the left and right optical paths toward the viewer's respective left and right eyes, and wherein the defined optical paths are free of any optical occluders, filters or polarizers and are free of any wedge lenses for modifying the images' vertical positions;

disanamorphic lens means located in the left and right optical paths, for horizontally expanding the respective left and right images being transmitted along the optical paths to the viewer's respective left and right eyes such that the images are restored to their normal two-dimensional proportions; and means for carrying the optical path means and disanamorphic lens means in predetermined positions on the viewer's head, to allow the viewer to move independently relative to the displayed side-by-side images and to selectively operate the means for adjusting convergence as the need arises;

wherein the viewer is enabled to perceive a three-dimensional image, in its normal two-dimensional proportions.

2. Portable stereoscopic viewing apparatus as defined in claim 1, and further comprising magnifying means located in the left and right optical paths, for magnifying the images being transmitted along the optical paths to the viewer's respective left and right eyes, such that the eyes receive the images in a magnified form.

3. Portable stereoscopic viewing apparatus as defined in claim 2, wherein:

the disanamorphic lens means includes separate lenses for horizontally expanding the left and right images; and the magnifying means includes separate lenses for magnifying the left and right images.

4. Portable stereoscopic viewing apparatus as defined in claim 1, wherein the optical path means includes:

means for selectively adjusting the interoccular spacing of the left and right optical paths at the viewer's left and right eyes;

whereby the stereoscopic viewing apparatus is adapted for use by multiple viewers.

5. Portable stereoscopic viewing apparatus as defined in claim 1, wherein:

the side-by-side display of related left and right images is provided by a conventional video screen, and the two images each occupy one-half of the screen; and the disanamorphic lens means horizontally expands the left and right images such that each image is restored to the two-dimensional proportions of the full video screen.

6. Portable stereoscopic viewing apparatus for providing a three-dimensional image for a viewer based on a side-by-side display on a conventional television screen of related left and right images that are each horizontally compressed, each image occupying about one-half of the screen, the apparatus comprising:

optical path means defining left and right optical paths for transmitting the displayed left and right images to a viewer's respective left and right eyes, wherein the defined optical paths are free of any optical occluders, filters or polarizers and are free of any wedge lenses for modifying the images' vertical positions, wherein the optical path means include means for selectively adjusting the convergence of the left and right optical paths toward the viewer's respective left and right eyes, whereby the apparatus is usable at a range of distances from the screen, and means for selectively adjusting the interoccular spacing of the left and right optical paths at the viewer's left and right eyes, whereby the stereoscopic viewing apparatus is adapted for use by multiple viewers;

magnifying means, including separate lenses located in the left and right optical paths, for magnifying the images being transmitted along the optical paths to the viewer's respective left and right eyes, such that the eyes receive the images in a magnified form;

disanamorphic lens means including separate lenses located in the left and right optical paths, for horizontally expanding the respective left and right images being transmitted along the optical paths to the viewer's respective left and right eyes such that the images are restored to their normal two-dimensional proportions; and a frame for carrying the optical path means, magnifying means, and disanamorphic lens means in predetermined positions on the viewer's head, to allow the viewer to move independently relative to the displayed side-by-side images;

wherein the viewer is enabled to perceive a three-dimensional image, in its normal two-dimensional proportions regardless of the viewer's range from, or positions relative to, the screen.

* * * * *